(12) United States Patent
Guedon

(10) Patent No.: US 11,509,513 B2
(45) Date of Patent: *Nov. 22, 2022

(54) AMPLITUDE-SHIFT KEYING DEMODULATION FOR WIRELESS CHARGERS

(71) Applicant: STMicroelectronics Asia Pacific Pte Ltd., Singapore (SG)

(72) Inventor: Yannick Guedon, Singapore (SG)

(73) Assignee: STMICROELECTRONICS ASIA PACIFIC PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,108

(22) Filed: Aug. 13, 2021

(65) Prior Publication Data

US 2021/0377084 A1 Dec. 2, 2021

Related U.S. Application Data

(63) Continuation of application No. 16/669,068, filed on Oct. 30, 2019, now Pat. No. 11,140,010.

(51) Int. Cl.
| | |
|---|---|
| *H04L 27/06* | (2006.01) |
| *H02J 50/12* | (2016.01) |
| *H02J 7/04* | (2006.01) |
| *H04L 25/49* | (2006.01) |
| *H02J 7/02* | (2016.01) |

(52) U.S. Cl.
CPC ............. *H04L 27/06* (2013.01); *H02J 7/025* (2013.01); *H02J 7/04* (2013.01); *H02J 50/12* (2016.02); *H04L 25/4904* (2013.01)

(58) Field of Classification Search
CPC ........ H04L 27/06; H04L 25/4904; H02J 7/04; H02J 50/12; H02J 7/025
See application file for complete search history.

(56) References Cited

U.S. PATENT DOCUMENTS

| | | |
|---|---|---|
| 2016/0336785 A1 | 11/2016 | Gao et al. |
| 2017/0018946 A1 | 1/2017 | Brink et al. |
| 2017/0271924 A1* | 9/2017 | Mao ..................... H02J 7/00034 |
| 2020/0195161 A1* | 6/2020 | Mayell .............. H02M 3/33571 |

* cited by examiner

*Primary Examiner* — Toan T Vu
(74) *Attorney, Agent, or Firm* — Slater Matsil, LLP

(57) ABSTRACT

A power transmitter includes: a first switch coupled between a first node and a reference voltage node; a second switch configured to be coupled between a power supply and the first node; a coil and a capacitor coupled in series between the first node and the reference voltage node; a first sample-and-hold (S&H) circuit having an input coupled to the first node; and a timing control circuit configured to generate a first control signal, a second control signal, and a third control signal that have a same frequency, where the first control signal is configured to turn ON and OFF the first switch alternately, the second control signal is configured to turn ON and OFF the second switch alternately, and where the third control signal determines a sampling time of the first S&H circuit and has a first pre-determined delay from a first edge of the first control signal.

23 Claims, 13 Drawing Sheets

AMPLITUDE-SHIFT KEYING DEMODULATION FOR WIRELESS CHARGERS

PRIORITY CLAIM AND CROSS-REFERENCE

This application is a continuation of U.S. patent application Ser. No. 16/669,068, filed on Oct. 30, 2019 and entitled "Amplitude-Shift Keying Modulation For Wireless Chargers," which application is incorporated herein by reference.

TECHNICAL FIELD

The present invention relates generally to wireless charging circuits, and, in particular embodiments, to circuits and methods for demodulation of amplitude-shift keying (ASK) modulated signal in a wireless charging system.

BACKGROUND

Wireless charging has become an increasingly popular charging technology. Wireless charging is sometimes known as inductive charging, which uses an electromagnetic field to transfer power between a power transmitter and a power receiver. The power is sent through inductive coupling to an electrical device, which can then use that power to charge batteries or run the device. Induction chargers use a first induction coil to create an alternating electromagnetic field from the transmitter and a second induction coil to receive the power from the electromagnetic field. The second induction coil converts the power back into electric current, which is then used to charge a battery or directly drive electrical devices. The two induction coils, when proximal to each other, form an electrical transformer.

Various industry standards have been developed recently to enable communication between a power transmitter and a power receiver. For example, amplitude-shift keying (ASK) modulation is used in some standards for in-band communication between the power receiver and the power transmitter. Current hardware for ASK demodulation tend to be bulky. In addition, ASK demodulation for in-band communication is challenging due to in-band noise. There is a need in the art for compact hardware design for ASK demodulation with high demodulation accuracy for wireless power systems.

SUMMARY

In some embodiments, a power transmitter includes: a first switch and a second switch, wherein the first switch and the second switch are connected at a first node, wherein the second switch is configured to be coupled between a power supply and the first node, and the first switch is configured to be coupled between the first node and a reference voltage node; a coil, wherein a first end of the coil is coupled to the first node, and a second end of the coil is configured to be coupled to the reference voltage node; a timing control circuit, wherein the timing control circuit is configured to generate a first control signal coupled to a first control terminal of the first switch, and configured to generate a second control signal coupled to a second control terminal of the second switch, wherein the first control signal and the second control signal are configured to turn ON the first switch while the second switch is turned OFF, and configured to turn OFF the first switch while the second switch is turned ON, wherein the first switch and the second switch are configured to be turned ON and OFF alternately at a same switching frequency; a first sample-and-hold (S&H) circuit coupled to the first node; and a second S&H circuit coupled to the second end of the coil, wherein the timing control circuit is further configured to generate a third control signal and a fourth control signal, wherein the third control signal enables the first S&H circuit to sample at the switching frequency, and the fourth control signal enables the second S&H circuit to sample at the switching frequency.

In some embodiments, a method of operating a power transmitter includes: generating, by a timing control circuit of the power transmitter, a first control signal and a second control signal; supplying the first control signal and the second control signal to a first control terminal of a first switch and a second control terminal of a second switch, respectively, wherein the first control signal turns ON and OFF the first switch alternately at a first switching frequency, wherein the second control signal turns ON and OFF the second switch alternately at the first switching frequency, wherein the first switch and the second switch are connected at a first node, the first switch is coupled between the first node and an electrical ground, and the second switch is coupled between a power supply and the first node; generating, by the timing control circuit, a third control signal and a fourth control signal, wherein the third control signal has a first pre-determined delay from a first edge of the first control signal, and the fourth control signal has a second pre-determined delay from a second edge of the second control signal; controlling operation of a first sample-and-hold (S&H) circuit with the third control signal, wherein an input of the first S&H circuit is coupled to the first node; and controlling operation of a second S&H circuit with the fourth control signal, wherein an input of the second S&H circuit is coupled to a second end of a coil, wherein a first end of the coil is coupled to the first node, and the second end of the coil is coupled to the electrical ground through a capacitor.

In some embodiments, a power transmitter includes: a first switch coupled between a first node and a reference voltage node; a second switch configured to be coupled between a power supply and the first node; a coil and a capacitor coupled in series between the first node and the reference voltage node; a first sample-and-hold (S&H) circuit, wherein an input of the first S&H circuit is coupled to the first node; and a timing control circuit configured to generate a first control signal, a second control signal, and a third control signal, wherein the first control signal, the second control signal, and the third control signal have a same frequency, wherein the first control signal is configured to turn ON and OFF the first switch alternately, the second control signal is configured to turn ON and OFF the second switch alternately, and the third control signal determines a sampling time of the first S&H circuit, wherein the third control signal has a first pre-determined delay from a first edge of the first control signal.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Throughout the discussion herein, unless otherwise specified, the same or similar numerals in different figures refer to the same or similar components.

The present invention will be described with respect to exemplary embodiments in a specific context, namely circuits and methods for demodulating ASK modulated signals in a wireless power system.

Figure 1:
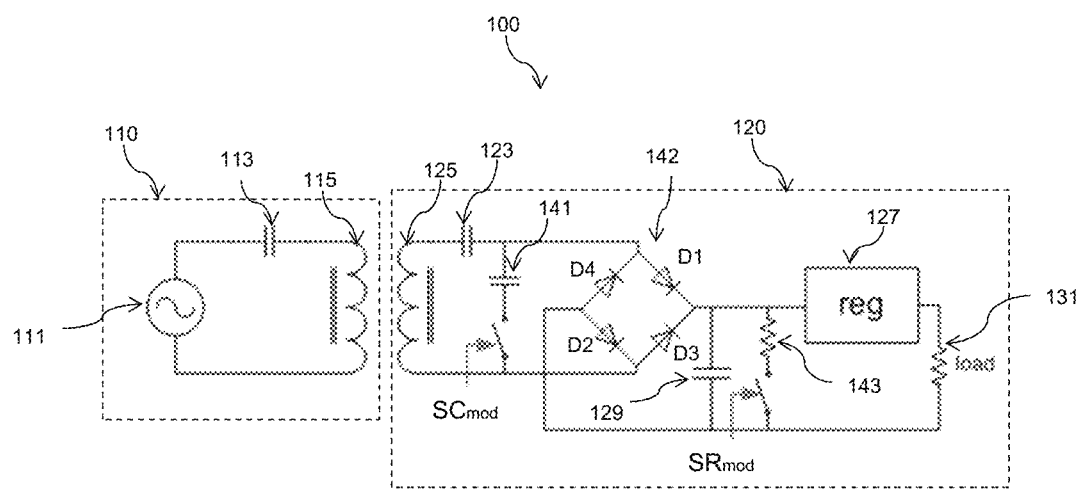
FIG. 1 illustrates a schematic view of wireless power system, in an embodiment.

FIG. 1 illustrates a schematic view of wireless power system 100, in an embodiment. In the discussion herein, a wireless power system may also be referred to as a wireless charging system. Note that for simplicity, not all features of the wireless power system 100 are illustrated.

As illustrated in FIG. 1, the wireless power system 100 includes a power transmitter 110 and a power receiver 120. The power transmitter 110 includes an alternate-current (AC) power supply 111, a capacitor 113, and a coil 115. The AC power supply 111 provides a high frequency (e.g., a few hundred kilohertz) AC current to the power transmitter circuit. The coil 115 enters a serial resonance with the capacitor 113, and generates a time-varying electromagnetic field due to the AC current applied.

Still referring to FIG. 1, the power receiver 120 includes a coil 125, a capacitor 123, a rectifier 142 (which includes diodes D1, D2, D3, and D4), and a capacitor 129. When the power transmitter 110 is charging the power receiver 120, the coil 125 is electromagnetically coupled to the coil 115 and enters a serial resonance with the capacitor 123, such that power is transferred from the power transmitter 110 to the power receiver 120. The rectifier 142 rectifies the AC voltage from the resonant network (which comprises the coil 125 and the capacitor 123 coupled in series) into a direct-current (DC) voltage. The capacitor 129 may function as a lower pass filter to filter out AC component in the output DC voltage from the rectifier 142, which capacitor 129 is commonly referred to as a tank capacitor. Although a full-bridge rectifier is illustrated in FIG. 1, any suitable rectifier, such as a half-bridge rectifier, may also be used.

In addition, FIG. 1 illustrates a regulator 127, which regulates (e.g., down-converts, up-converts, and/or stabilizes) the output voltage from the rectifier 142, and sends the regulated voltage to a load 131 (e.g., a battery to be charged or battery charger input). In some embodiments, the regulator 127 is omitted. In some embodiments, the AC power supply 111 and the load 131 are considered as external components that are connected to the wireless power system 100, thus are not part of the wireless power system 100.

FIG. 1 further illustrates a capacitor 141 coupled to a switch SCmod, and a resistor 143 coupled to a switch SRmod used for ASK modulation. In a wireless power system, it may be advantageous for the power transmitter to transfer the right amount of energy to the power receiver, and to ensure that the receiver has the means to communicate the demand for power to the transmitter. Industry standards, such as the Qi standard developed by the Wireless Power Consortium (WPC), enables power receiver to communicate with the power transmitter through in-band communication and use ASK modulation to transmit communication signals (also referred to as transmitted data). For example, to transmit a bit "1," a control circuit of the power receiver 120 may generate a control signal to close the switch SCmod (or SRmod) for a pre-determined period of time (e.g., 500 ms). Similarly, to transmit a bit "0," the switch SCmod (or SRmod) is opened for the pre-determined period of time. Polarity for transmitting bits "1" and "0" may be inverted as defined by the standard.

Closing or opening the switch SCmod (or SRmod) changes the impedance of the power receiver 120, which, through electromagnetic coupling, induces changes at the power transmitter side. For example, the modulation (e.g., opening and closing of the switch) at the power receiver side (also referred to as the secondary side) may induce changes in the current, voltages, and/or frequency observed at the power transmitter side (also referred to as the primary side). By detecting changes (e.g., current change, voltage change, and/or frequency change) at the power transmitter side, the ASK modulated signal transmitted at the power receiver side may be detected and demodulated. The ASK modulation may be performed by opening/closing the switch SCmod, or the switch SRmod, or both switches SCmod and SRmod.

Figure 2:
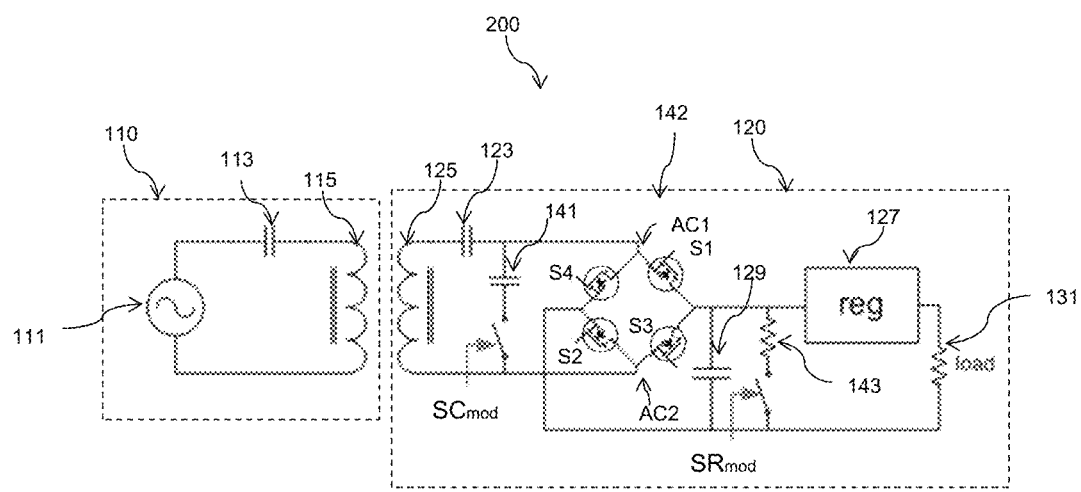
FIG. 2 illustrates a schematic view of another wireless power system, in an embodiment.

FIG. 2 illustrates a schematic view of another wireless power system 200, in an embodiment. The wireless power system 200 is similar to the wireless power system 100 in FIG. 1, but the rectifier 142 in FIG. 2 is formed of switches S1, S2, S3, and S3 instead of the diodes shown in FIG. 1. The switches S1, S2, S3, and S4 may be any suitable switch, such as a transistor (e.g., a metal-oxide-semiconductor fieldeffect transistor (MOSFET)). A control circuit of the power receiver 120 may generate control signals coupled to control terminals (e.g., gates) of the switches. The control signals are configured to turn on the switches S1 and S2 while the switches S3 and S4 are turned off, and to turn on the switches S3 and S4 while the switches S1 and S2 are turned off, as one skilled in the art readily appreciates. When a switch (e.g., S1, S2, S3, or S4) is turned on, a low-impedance path is formed between the load path terminals (e.g., drain/source terminals) of the switch, and an electrical current flows through the load path terminals.

In the examples of FIG. 1 and FIG. 2, the power transmitter 110 may be a wireless charging station (e.g., a charging pad, or a charging appliance), and the power receiver 120 may be a mobile device (e.g., a cell phone). However, a power receiver 120 may be designed to include additional circuits, such that it can also function as a power transmitter to offer charging capability. Such a power receiver may be referred to as a combo Tx/Rx power device. For example, a cell phone may be designed as a combo Tx/Rx power device, such that it not only can be charged in an Rx mode by a wireless charging station, but also can function in a Tx mode as a wireless charging station to charge another cell phone. Due to the space limitation of the mobile device, the combo Tx/Rx device should be compact for easy integration. In addition, reliable ASK demodulation should be achieved. The disclosed embodiments herein achieve the above requirements.

Figure 3:
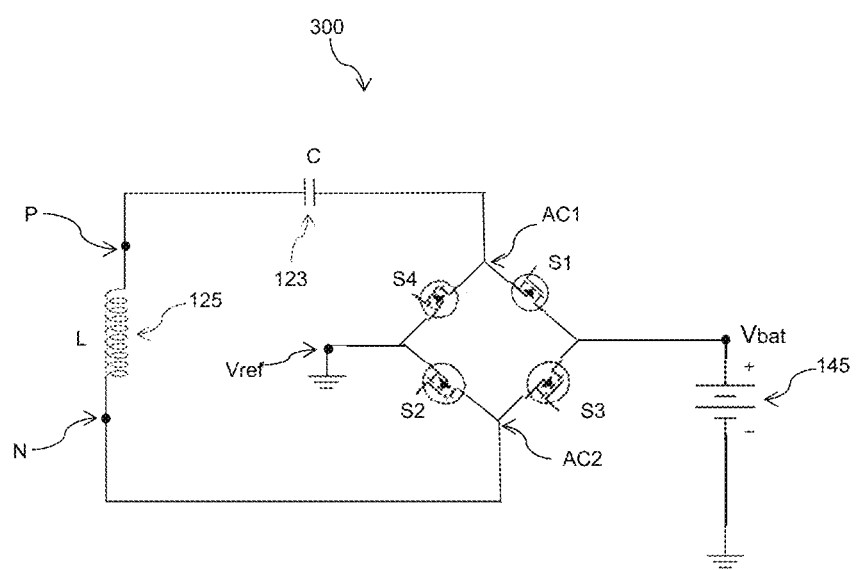
FIG. 3 illustrates a schematic view of a power transmitter, in an embodiment.

FIG. 3 illustrates a schematic view of a full-bridge power transmitter 300, in an embodiment. In the illustrated embodiments, the power transmitter 300 is the equivalent schematic view of a combo Tx/Rx power device in the Tx mode, and the power receiver 120 in FIG. 2 is the equivalent schematic view of the combo Tx/Rx power device in the Rx mode. Note that for clarity, not all features of the power transmitter 300 are illustrated in FIG. 3. In addition, the battery 145 shown in FIG. 3 may be considered an external component connected to the power supply node Vbat and not a part of the power transmitter 300.

As illustrated in FIG. 3, the power transmitter 300 includes a coil L (which is the coil 125 in FIG. 2) and a capacitor C (which is the capacitor 123 in FIG. 2) coupled in series. The switches S1, S2, S3, and S4 form a full-bridge. The switch S1 is coupled between the node AC1 and a power supply node Vbat, which is connected to the positive terminal of a battery 145 (which may be the load 131 coupled in serial with the regulator 127 in FIG. 2). The switch S4 is coupled between the node AC1 and a reference voltage node (e.g., connected to electrical ground). The switch S3 is coupled between the power supply node Vbat and the node AC2. The switch S2 is coupled between the reference voltage node and the node AC2.

Figure 4:
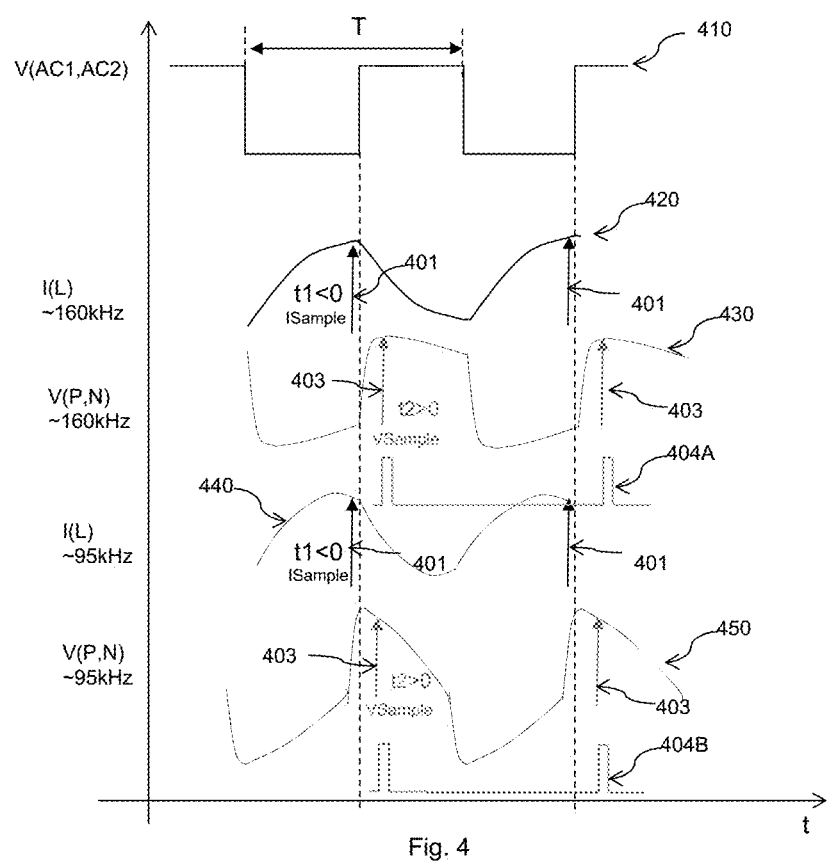
FIG. 4 illustrates a timing diagram for sampling the current and the voltage of the power transmitter of FIG. 3, in an embodiment.

A control circuit of the power transmitter 300 generates control signals to turn on and off the switches S1, S2, S3, and S4 to generate positive or negative voltages between the node AC1 and the node AC2. In the discussion herein, the voltage between the node AC1 and the node AC2 is denoted as V(AC1, AC2), where a positive value for V(AC1, AC2) indicates that the voltage at the node AC1 is higher than the voltage at the node AC2, and vice versa. For example, the control signals may turn on the switches S1 and S2 (while switches S3 and S4 are turned off) to generate a positive V(AC1, AC2), and next, may turn on the switches S3 and S4 (while switches S1 and S2 are turned off) to generate a negative V(AC1, AC2). The above process repeats at a switching frequency, and therefore, the DC voltage of the battery 145 is turned into an AC voltage, and a time-varying electromagnetic field is generated by the coil L for transferring energy to a power receiver, which power receiver may have a structure same as or similar to the power receiver 120 in FIG. 1 or FIG. 2. The power receiver may communicate with the power transmitter 300 through ASK modulation. FIG. 4 shows the timing control signals for detection of variations in the amplitude of the current and voltage in the power transmitter 300 due to the ASK modulation at the power receiver side.

FIG. 4 illustrates a timing diagram for sampling the current and the voltage of the power transmitter of FIG. 3, in an embodiment. In FIG. 4, the x-axis represents time, and the y-axis represents amplitude of the various signals. In the example of FIG. 4 (and subsequent example timing diagrams), a resonance frequency of the power transmitter (e.g., 300), determined by the capacitance of the capacitor C and the inductance of the coil L, is smaller than the switching frequency of the power transmitter. The switching frequency may be calculated as an inverse of the switching period T (see, e.g., FIGS. 4 and 7) of the switching control signals. For example, the resonance frequency of the power transmitter 300 may be about 80 KHz, and the switching frequency of the power transmitter 300 may be between about 95 KHz and about 200 KHz.

In FIG. 4, the curve 410 illustrates the voltage signal V(AC1, AC2) over time. Note that V(AC1, AC2) is determined by the control signals used to turn on and off the switches S1, S2, S3, and S4, and therefore, the status of the control signals may be deduced from the voltage signal V(AC1, AC2). Accordingly, the voltage V(AC1, AC2) may also be referred to as a switching control signal. The curves 420 and 430 illustrates the current I(L) flowing through the coil L, and the voltage V(P,N) between the node P and the node N (see FIG. 3), when the switching frequency of the power transmitter 300 is 160 KHz. For comparison, the curves 440 and 450 illustrates the current I(L) and the voltage V(P,N), when the switching frequency of the power transmitter 300 is 95 KHz.

FIG. 4 further illustrates the sampling control signals 401 and 403, which are illustrated as arrows in FIG. 4 to indicate the time instants at which the current I(L) and the voltage V(P,N) are sampled, respectively. The sampling control signals 401 and 403 may be any suitable control signals, such as the rising edges of clock signals 404A and 404B, respectively. For simplicity, subsequent figures shows the sampling control signals (e.g., 701/703, 801/803, and 901/903) as arrows, with the understanding that the arrows indicate the locations of, e.g., the rising edges of respective clock signals. The sampled values of the current I(L) and/or the sampled values of the voltage V(P, N) are then sent to an ASK demodulation circuit to detect the digital data (e.g., zeros or ones) transmitted by the power receiver.

Since an ASK demodulation circuit demodulates the transmitted ASK signal by detecting changes in the amplitude of the current and/or the voltage, it may be advantageous to sample the current I(L) and/or the voltage V(P, N) at or near their respective peak values, in order to improve noise immunity and reduce demodulation error. Note that sampling near the peak values of the current or voltage signals may be sufficient for the ASK demodulation, since the ASK demodulation may reply on the differences between (instead of absolute value) the sampled values for demodulation.

In the example of FIG. 4, the sampling instant (see sampling control signals 401) for the current I(L) occurs once in each switching period T, at the end of each low state for V(AC1, AC2) (e.g., when V(AC1, AC2) has negative values). In other words, the sampling frequency for the current I(L) is the same as the switching frequency of the power transmitter, and each sampling instant precedes a respective rising edge of the V(AC1, AC2) by a pre-determined duration. Therefore, the sampling instant for the current I(L) is also referred as having a pre-determined negative delay t1 (t1<0) from a respective rising edge of the voltage signal V(AC1, AC2). Here the respective rising (or falling) edge refers to a nearest rising (or falling) edge.

Similar, the sampling frequency for the voltage V(P, N) is the same as the switching frequency of the power transmitter, and the sampling instant for the voltage V(P,N) has a pre-determined delay t2 (t2>0) from a respective rising edge of the voltage signal V(AC1, AC2). Accordingly, there is a pre-determined delay (e.g., t2−t1, where t1 has a negative value) between the sampling control signals 401 and 403. In some embodiments where the switching frequency is between about 95 KHz and about 200 KHz, the magnitude (e.g., absolute value) of the delay t1 is between about 0 µs and about 1 µs, and the magnitude of the delay t2 is between about 0.2 µs and about 1.5 µs. Since sampling control signals 401 and 403 have a same frequency as the switching frequency, and have a fixed relation (e.g., delay) with the switching control signal, the sampling control signals 401 and 403 are referred to as being synchronized with the switching control signal.

Figure 5:
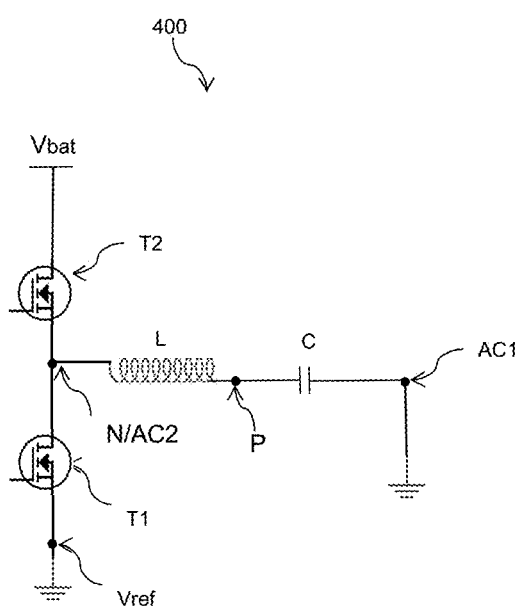
FIG. 5 illustrates a schematic view of a power transmitter, in an embodiment.

FIG. 5 illustrates a schematic view of a half-bridge power transmitter 400, in an embodiment. In the illustrated embodiments, the power transmitter 400 is the equivalent schematic view of a combo Tx/Rx power device in the Tx mode, and may be similar to the power transmitter 300, but with some modifications for a half-bridge configuration. For example, the power transmitter 400 may be formed by removing the switches S1 and S4 in FIG. 3, and by connecting the node AC1 in FIG. 3 to electrical ground directly. The control circuit of the power transmitter 400 is also modified to generate control signals for the remaining switches S2 and S3. Therefore, the switches T2 and T1 in FIG. 5 may correspond to the switch S3 and S2 in FIG. 3, respectively. Note that for clarity, not all features of the power transmitter 400 are illustrated in FIG. 5.

In FIG. 5, the power transmitter 400 includes a switch T1 coupled between the node N (which is also the node AC2) and the reference voltage node Vref (e.g., electrical ground), and includes a switch T2 coupled between the power supply node Vbat and the node N. In addition, the power transmitter 400 includes the coil L and the capacitor C, which are coupled in series between the node N and the electrical ground. A first end of the coil L is coupled to the node N, and a second end of the coil L is coupled to the capacitor C.

Figure 6A:
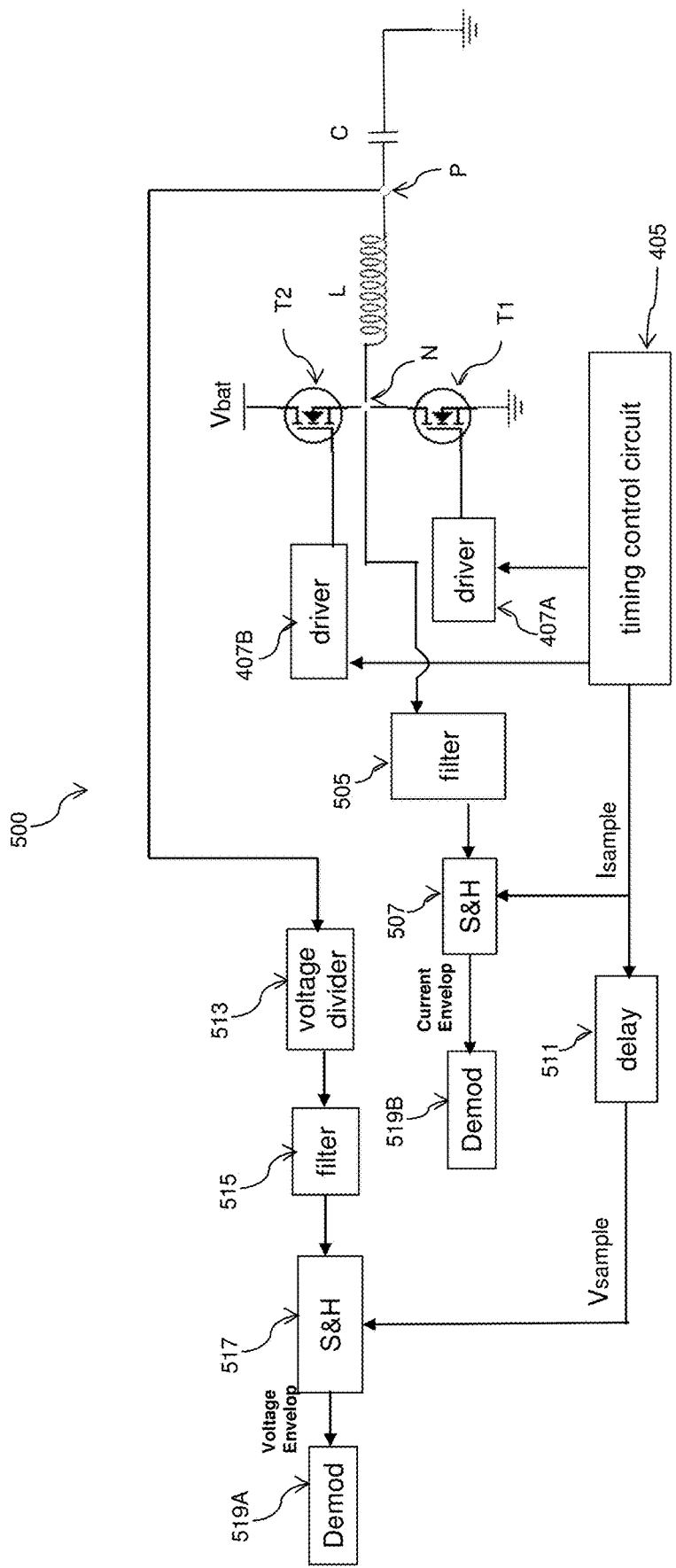
FIG. 6A illustrates a schematic view of a power transmitter, in an embodiment.

FIG. 6A illustrates a schematic view of a power transmitter 500 which produces current samples and voltage samples for ASK demodulation, in an embodiment. The power transmitter 500 may be a more detailed diagram of the power transmitter 400, or may be formed by adding additional circuits to the power transmitter 400 of FIG. 5 to produce samples of the current I(L) and samples of the voltage V(P, N) for ASK demodulation of data transmitted from an electromagnetically coupled power receiver.

In FIG. 6A, the power transmitter 500 includes a timing control circuit 405, also referred to as a control circuit. The power transmitter 500 also includes driver circuits 407A and 407B coupled between the timing control circuit 405 and the switches T1 and T2, respectively. The driver circuits 407A and 407B may be any suitable driver circuits known in the art. In some embodiments, the driver circuits 407A and 407B are omitted, and the switching control signals from the timing control circuit 405 are coupled directly to the control terminals of the switches T1 and T2.

The timing control circuit 405 is a digital hardware configured to generate control signals (e.g., digital clock signals) for switching on and off the switches T1 and T2 at the switching frequency. The timing control circuit 405 is also configured to generate current sampling control signal $I_{sample}$ and voltage sampling control signal $V_{sample}$, which indicate the time instants at which the current I(L) and the voltage V(P,N) are sampled, respectively. As discussed hereinafter, there is a pre-determined delay between the current sampling control signal $I_{sample}$ and voltage sampling control signal $V_{sample}$, and therefore, a delay circuit 511 with the pre-determined delay is coupled between the current sampling control signal $I_{sample}$ and voltage sampling control signal $V_{sample}$. Details of the control signals generated by the timing control circuit 405 are discussed hereinafter with reference to FIGS. 7-10.

Figure 6B:
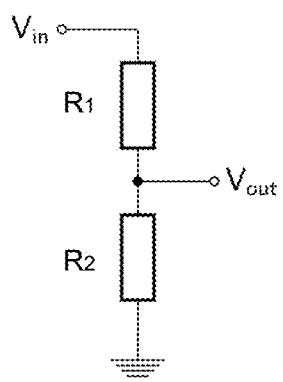
FIG. 6B illustrates a schematic view of a voltage divider, in some embodiments.
Figure 6C:
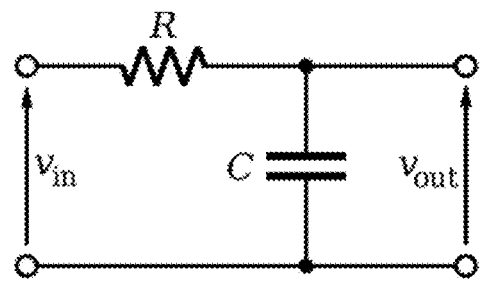
FIG. 6C illustrates a schematic view of a resistor-capacitor (RC) filter, in some embodiments.
Figure 11:
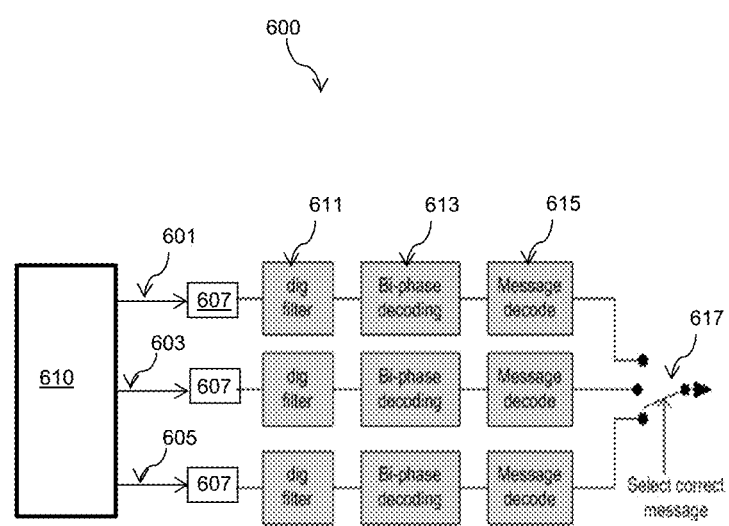
FIG. 11 illustrates a block diagram of a power transmitter with parallel ASK demodulation paths, in some embodiments.

FIG. 6A illustrates a filter 505 coupled between the node N and a sample-and-hold (S&H) circuit 507. When the current in the coil L flows through the switch T1, the voltage drop across the load path terminals of the switch T1 is used as an image of (e.g., a value proportional to) the current value I(L). In other words, the switch T1 also functions as a sensing device for the current I(L). The filter 505 may be a simple resistor-capacitor (RC) filter (see, e.g., FIG. 6C), or other suitable low-pass analog filter. In some embodiments, the filter 505 is not permanently connected to the node N, and instead, there may be a switch coupled between the node N and the filter 505, which switch may be turned on or off by a control signal, such that the filter 505 may be disconnected from the node N at appropriate time. For example, when the node N is high (e.g., having a high voltage), the filter 505 may be disconnected from the node N, so that the filter 505 does not probe the node N in order to avoid saturation or voltage overstress. A bandwidth of the filter 505 may be determined by the switching frequency to ensure that in-band signal passes through while out-of-band noise is rejected. For example, a bandwidth of the filter 505 may be a few hundred kilohertz wide. The current sampling control signal $I_{sample}$ controls the sampling instant of the S&H circuit 507. At each time instant indicated by the current sampling control signal $I_{sample}$, the S&H circuit 507 samples the current value I(L) and holds the sampled value. The output of the S&H circuit 507 may be sent directly to an analog-to-digital converter (ADC) to convert into a digital signal, in some embodiments. In other embodiments, the output of the S&H circuit 507 may be sent to a signal conditioning hardware before being converted into a digital signal by an ADC. After the ADC conversion, further digital signal processing, such as ASK demodulation, error correction decoding, may be performed to decode the message sent from the power receiver to the power transmitter. FIG. 6A illustrates a demodulation circuit 519B coupled to the output of the S&H circuit 507, which demodulation circuit 519B comprises an ASK demodulation circuit. Details of the demodulation circuit 519B are illustrated in FIG. 11, which may include an ADC circuit 607, a digital filter 611, a demodulation circuit 613 (e.g., an ASK demodulation circuit), and a decoder 615.

FIG. 6A further illustrates a voltage divider 513 coupled to the node P. The voltage divider may be a simple resistor based voltage divider (see, e.g., FIG. 6B), or other suitable divider, such as a switched-capacitance voltage divider, in which case care should be taken to filter out high-frequency noise before the voltage is divided by the switched-capacitance voltage divider. In some embodiments, the voltage divider 513 is not permanently connected to the node P, and therefore, is coupled to the node P through, e.g., a switch that may be turned on and off by a control signal at appropriate time. The output of the voltage divider 513 is sent to a filter 515, which is a low-pass analog filter same as or similar to the filter 505. The output of the filter 515 is sent to the input of a S&H circuit 517. The voltage sampling control signal $V_{sample}$ controls the sampling instant of the S&H circuit 517. At each time instant indicated by the voltage sampling control signal $V_{sample}$, the S&H circuit 517 samples an image of the voltage value V(P,N) and holds the sampled value. The output of the S&H circuit 517 may be sent directly to an analog-to-digital converter (ADC) to convert into a digital signal, in some embodiments. In other embodiments, the output of the S&H circuit 517 may be sent to a signal conditioning hardware before being converted into a digital signal by an ADC. After the ADC conversion, further digital signal processing, such as ASK demodulation, error correction decoding, may be performed to decode the message sent from the power receiver to the power transmitter. FIG. 6A illustrates a demodulation circuit 519A coupled to the output of the S&H circuit 517, which demodulation circuit 519A comprises an ASK demodulation circuit. Details of the demodulation circuit 519A are illustrated in FIG. 11, which may include an ADC circuit 607, a digital filter 611, a demodulation circuit 613 (e.g., an ASK demodulation circuit), and a decoder 615.

In the example of FIG. 6A, two S&H circuits 507 and 517 are used to sample both the current value I(L) and the voltage value V(P, N). This allows for ASK demodulation using different signals in multiple demodulation/decoding paths to improve robustness and accuracy. In other embodiments, to reduce hardware cost, only one of the S&H circuits 507 and 517 and its related components (e.g., filter, and voltage divider if needed) are used to provide sampled values of the current I(L) or sampled values of the voltage V(P, N).

Figure 7:
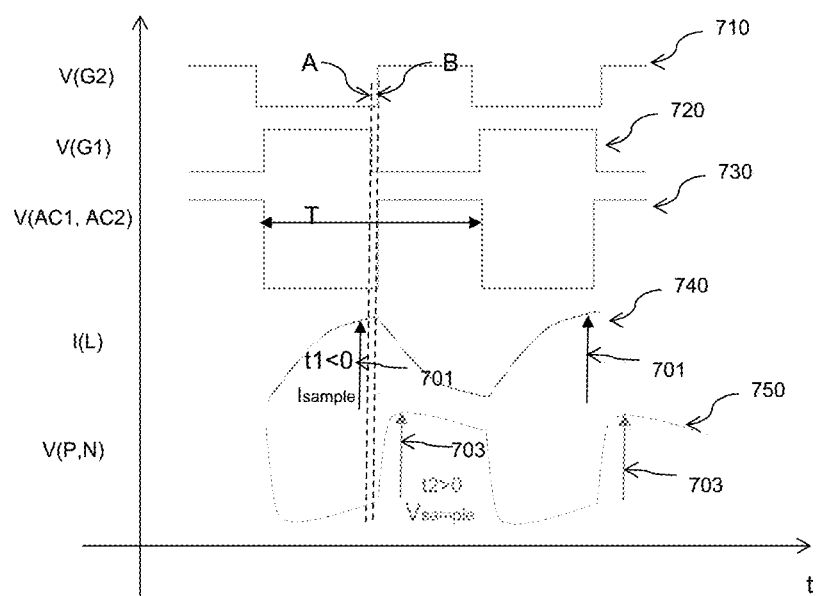
FIG. 7 illustrates a timing diagram for sampling the current and the voltage of the power transmitter of FIG. 6A, in an embodiment.

FIG. 7 illustrates a timing diagram for sampling the current and the voltage of the power transmitter 500 of FIG. 6A, in an embodiment. In FIG. 7, the curves 710 and 720 illustrate the gate control voltages V(G2) and V(G1) (also referred to as switching control signals) generated by the timing control circuit 405 to turn on and off the switches T2 and T1, respectively. In the example of FIG. 7, it is assumed that a logic high voltage turns on the switches T1 and T2, and a logic low voltage turns off the switches T1 and T2. Note that the gate control voltages V(G1) and V(G2) are non-overlapping driving signals. In other words, when V(G1) is high (e.g., switch T1 is turned on), V(G2) is low (e.g., switch T2 is turned off); when V(G2) is high (e.g., switch T2 is turned on), V(G1) is low (e.g., switch T1 is turned off). The curve 730 illustrates the voltage V(AC1, AC2). The curves 740 and 750 illustrate the current I(L) and the voltage V(P,N). The current sampling control signal $I_{sample}$ (see label 701) and the voltage sampling control signal $V_{sample}$ (see label 703), which are illustrated as arrows in FIG. 7, indicate the time instants at which the current I(L) and the voltage V(P,N) are sampled by the S&H circuits (e.g., 507, 517), respectively.

As illustrated in FIG. 7, the current sampling control signal $I_{sample}$ and the voltage sampling control signal $V_{sample}$ have a same frequency as the switching control signals, and are synchronized with the switching control signals. In the example of FIG. 7, the current sampling control signal $I_{sample}$ has a pre-determined delay t1 (t1≤0) from a respective falling edge of the gate control voltage V(G1), and the voltage sampling control signal $V_{sample}$ has a pre-determined delay t2 (t2>0) from a respective rising edge of the gate control voltage V(G2). The dashed line A in FIG. 7 illustrates a falling edge of the gate control voltage V(G1), and the dashed line B illustrates a rising edge of the gate control voltage V(G2). In some embodiments where the switching frequency is between about 95 KHz and about 200 KHz, the magnitude (e.g., absolute value) of the delay t1 is between about 0 μs and about 1 μs, and the magnitude of the delay t2 is between about 0.2 μs and about 1.5 μs. Since the timing control circuit 405 generates the gate control voltages V(G1) and V(G2), it knows where the rising edge and the falling edge of each gate control voltage are. Since the current sampling control signal $I_{sample}$ and the voltage sampling control signal $V_{sample}$ have pre-determined delays (e.g., t1, t2) from the rising edge or falling edge of a respective gate control signal, it is straightforward for the timing control circuit 405 to generate the current sampling control signal $I_{sample}$ and the voltage sampling control signal $V_{sample}$.

Figure 9:
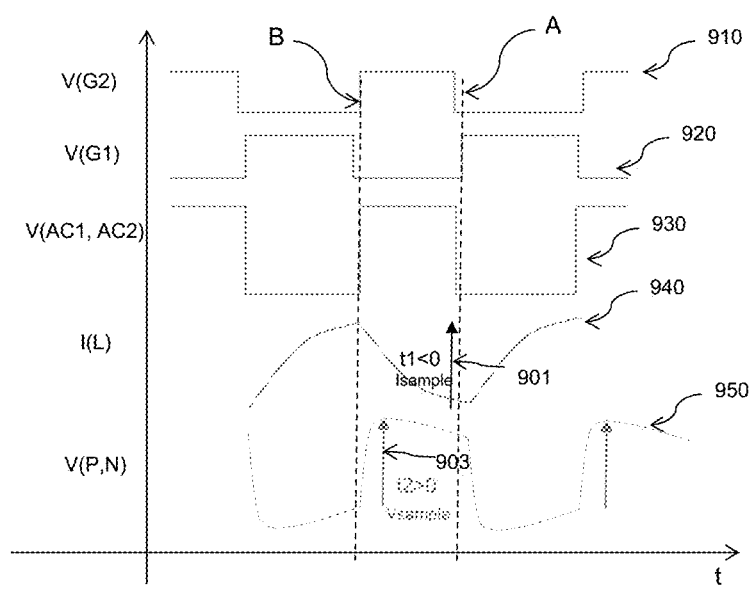
FIG. 9 illustrates a timing diagram for sampling the current and the voltage of the power transmitter of FIG. 6A, in another embodiment.
Figure 10:
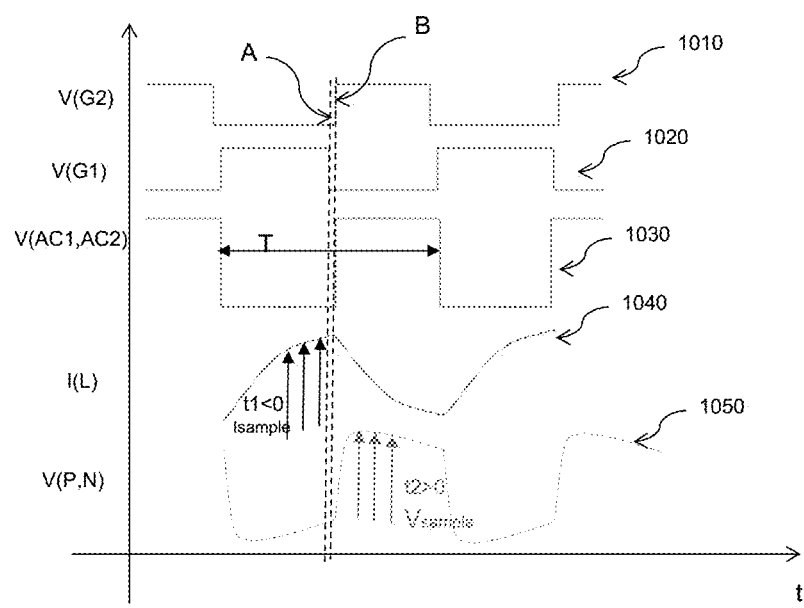
FIG. 10 illustrates a timing diagram for sampling the current and the voltage of the power transmitter of FIG. 6A, in yet another embodiment.

The current sampling control signal $I_{sample}$ and the voltage sampling control signal $V_{sample}$ illustrated in FIG. 7 is a non-limiting example. Other choices are also possible and are fully intended to be included within the scope of the present disclosure. Additional examples for the current sampling control signal $I_{sample}$ and the voltage sampling control signal $V_{sample}$ are illustrated in FIGS. 8-10.

Figure 8:
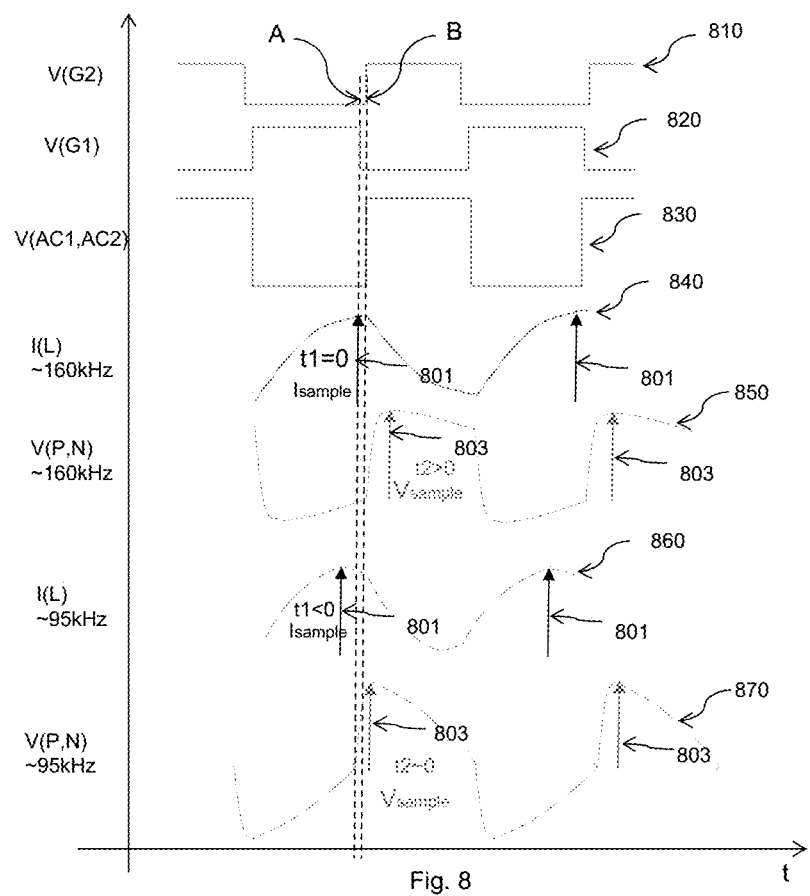
FIG. 8 illustrates a timing diagram for sampling the current and the voltage of the power transmitter of FIG. 6A, in another embodiment.

FIG. 8 illustrates a timing diagram for sampling the current and the voltage of the power transmitter 500 of FIG. 6A, in another embodiment. In some embodiments, the characteristics of the amplitudes of the current I(L) and the voltage V(P,N) due to ASK modulation depends on, at least partially, the switch frequency used, and is known (e.g., may be measured and stored in a table in the memory). Therefore, the sampling time for the current I(L) and the voltage V(P,N) may be adjusted in accordance with the switching frequency to achieve better ASK demodulation results. FIG. 8 shows two examples of adjusted sampling time (e.g., adjusted from the example of FIG. 7) for a high switching frequency of 160 KHz and a low switching frequency of 95 KHz.

The curves in FIG. 8 are similar to those in FIG. 7. The curves 840 and 850 illustrate the current I(L) and the voltage V(P,N) at a switching frequency of 160 KHz. The current sampling control signal $I_{sample}$ (see label 801) has been adjusted to have a pre-determined delay t1=0 from (therefor aligned with) a respective falling edge of the gate control signal V(G1), while the voltage sampling control signal $V_{sample}$ (see label 803) has a pre-determined delay t2 (t2>0) from a respective rising edge of the gate control signal V(G2).

Still referring to FIG. 8, the curves 860 and 870 illustrate the current I(L) and the voltage V(P,N) at a switching frequency of 95 KHz. The current sampling control signal $I_{sample}$ (see label 801) has a pre-determined delay t1 (t1<0) from a respective falling edge of the gate control signal V(G1), while the voltage sampling control signal $V_{sample}$ (see label 803) has been adjusted to have a pre-determined delay t2 (t2~0) from a respective rising edge of the gate control signal V(G2). In some embodiments where the switching frequency is between about 95 KHz and about 200 KHz, the magnitude (e.g., absolute value) of the delay t1 is between about 0 μs and about 1 μs, and the magnitude of the delay t2 is between about 0.1 μs and about 1.5 μs.

FIG. 9 illustrates a timing diagram for sampling the current and the voltage of the power transmitter 500 of FIG. 6A, in another embodiment. In FIG. 9, the current sampling control signal $I_{sample}$ (see label 901) has a pre-determined delay t1 (t1<0) from a respective rising edge of the gate control signal V(G1), while the voltage sampling control signal V$_{sample}$ (see label 903) has a pre-determined delay t2 (t2>0) from a respective rising edge of the gate control signal V(G2). Note that in FIG. 9, the current sampling control signal I$_{sample}$ and the voltage sampling control signal V$_{sample}$ are space apart by about half of the switching period T. Therefore, the ADC only needs to convert a sample into digital data about every half of a switching period T. Compared with the examples in FIGS. 7 and 8 where the current sampling control signal I$_{sample}$ and the voltage sampling control signal V$_{sample}$ are closed to each other, the requirement for the speed of ADC is relaxed in the embodiment of FIG. 9.

In another embodiment (not illustrated), the current sampling control signal I$_{sample}$ has a pre-determined delay t1 (t1<0) from a respective falling edge of the gate control signal V(G1), while the voltage sampling control signal V$_{sample}$ has a pre-determined delay t2 (t2>0) from a respective falling edge of the gate control signal V(G2). In yet another embodiment (not illustrated), the current sampling control signal I$_{sample}$ has a pre-determined delay t1 (t1<0) from a respective rising edge of the gate control signal V(G1), while the voltage sampling control signal V$_{sample}$ has a pre-determined delay t2 (t2>0) from a respective falling edge of the gate control signal V(G2).

FIG. 10 illustrates a timing diagram for sampling the current and the voltage of the power transmitter 500 of FIG. 6A, in yet another embodiment. The choice for the sampling instants indicated by the current sampling control signal I$_{sample}$ and the voltage sampling control signal V$_{sample}$ is similar to that in FIG. 7. However, in FIG. 10, during each switching period, the current I(L) is sampled multiple times by the S&H circuit 507 (and converted into multiple digital samples by an ADC circuit) preceding a respective falling edge of the gate control signal V(G1). In addition, the voltage V(P, N) is sampled multiple times by the S&H circuit 517 (and converted into multiple digital samples by an ADC circuit) after a respective rising edge of the gate control signal V(G2). In other words, in the example of FIG. 10, multiple samples of the current I(L) and multiple samples of the voltage V(P, N) are taken in each cycle (e.g., each switching period) of the switching control signal. The corresponding multiple samples may be processed by digital process techniques to further improve the ASK demodulation results and provide robustness against noises in the digital samples. For example, filtering techniques, such as a simple averaging process or a more advanced filtering process, may be used to improve ASK demodulation performance. One skilled in the art will readily appreciate that the multiple sample method discussed above for the example of FIG. 10 may also be applied to other embodiments, such as the embodiment of FIG. 8.

FIG. 11 illustrates a block diagram of a power transmitter 600 with parallel ASK demodulation paths, in some embodiments. The power transmitter 600 in FIG. 11 may be a more detailed diagram of the power transmitter 500 in FIG. 6A, or may be formed by adding additional circuits to the power transmitter 500 in FIG. 6A.

In the example of FIG. 11, the power transmitter 600 includes an analog block 610, which may be the power transmitter 500 in FIG. 6A. The analog block 610 provides three sensing points 601, 603, and 605 for sensing variations in the current (e.g., I(L)), the voltage (e.g., V(P,N)), and the frequency (e.g., the frequency or equivalently the phase, of the switching frequency) at the power transmitter side, respectively. In an embodiment where the power transmitter 500 in FIG. 6A is used as the analog block 610, the output of the S&H circuit 507 provides a sensing point for sensing the current, and the output of the S&H circuit 517 provides a sensing point for sensing the voltage. For frequency sensing, a suitable sensing method, such as the method disclosed in U.S. Patent Application No. 20160372934, may be used. U.S. Patent Application No. 20160372934 is incorporated by reference herein.

As illustrated in FIG. 11, the current, voltage, and phase observations are converted into digital samples by ADC circuits 607, and processed in digital domain in three parallel signal processing paths to demodulate and decode the message sent by the power receiver. In other words, the power transmitter 600 demodulates and decodes the transmitted data from the power receiver in three different signal processing paths using different sensing observations (e.g., current, voltage, and phase).

In FIG. 11, each signal processing path includes a digital filter 611, a demodulation circuit 613, and a decoder 615. The digital filter 611 may remove out-of-band noise. The demodulation circuit 613 may perform the ASK demodulation to recover the transmitted data. The decoder 615 may perform error correction decoding and/or error detection for the data produced by the demodulation circuit 613. A suitable error detection method, such as parity check or cyclic redundancy check (CRC), may be used to determine which signal processing path produces a valid decoding result. The output from the signal processing path having the valid decoding result is selected by the selector 617 as the final output.

Redundancy is provided by decoding the transmitted data using three different signal processing paths. Studies have shown that the amount of variations in the current, voltage, and frequency at the power transmitter side depends on many factors, such as topology of the power transmitter/ power receiver, impedances of the power transmitter/power receiver, the coupling factor between the coils of the power transmitter and the power receive, or the like. As a result, under certain conditions (e.g., load condition, switching frequency), ASK modulation at the power receiver side may cause insignificant amount of variation in the current, voltage, or frequency at the power transmitter side, which may cause difficulties for ASK demodulation. However, it is unlikely that the current, voltage, and frequency all have insignificant variation at the same time. Therefore, by demodulating the ASK signal using all three sensing observations (e.g., current, voltage, frequency), at least one of the signal processing path may be able to correctly recover the data transmitted by the power receiver.

Figure 12:
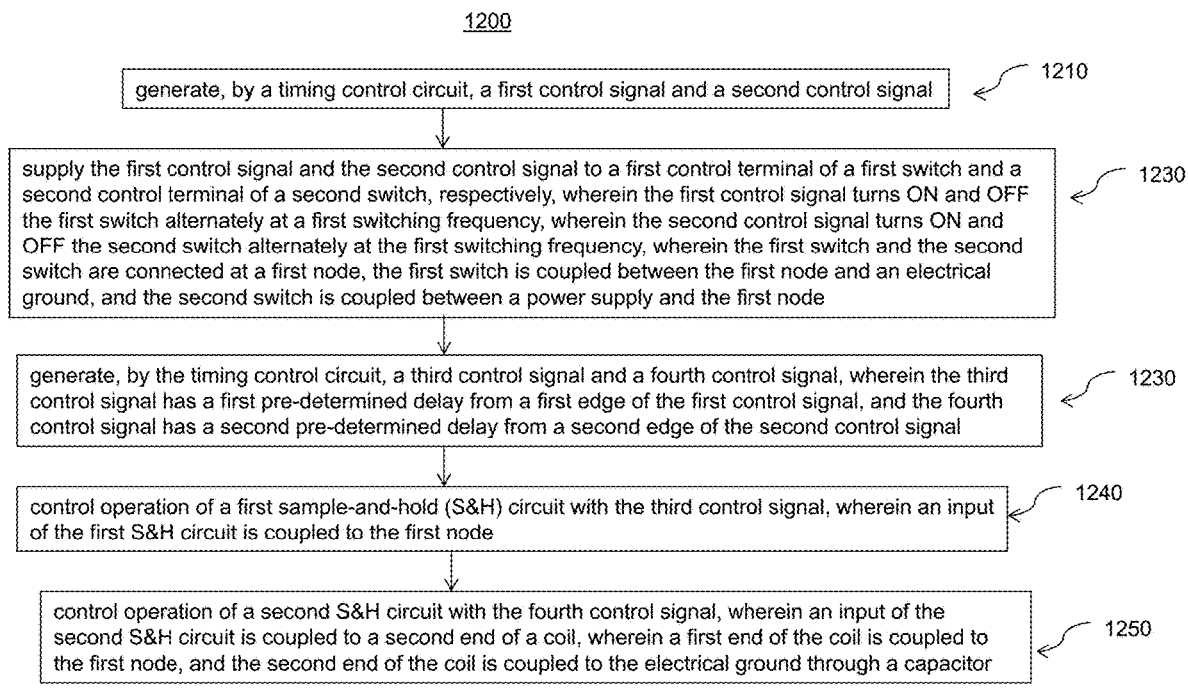
FIG. 12 illustrates a flow chart of a method for operating a power transmitter, in some embodiments.

FIG. 12 illustrates a flow chart of a method for operating a power transmitter, in some embodiments. It should be understood that the embodiment method shown in FIG. 12 is merely an example of many possible embodiment methods. One of ordinary skill in the art would recognize many variations, alternatives, and modifications. For example, various steps as illustrated in FIG. 12 may be added, removed, replaced, rearranged and repeated.

Referring to FIG. 12, at step 1210, a timing control circuit of the power transmitter, generates a first control signal and a second control signal. At step 1020, the first control signal and the second control signal are supplied to a first control terminal of a first switch and a second control terminal of a second switch, respectively, wherein the first control signal turns ON and OFF the first switch alternately at a first switching frequency, wherein the second control signal turns ON and OFF the second switch alternately at the first switching frequency, wherein the first switch and the second switch are connected at a first node, the first switch is coupled between the first node and an electrical ground, and the second switch is coupled between a power supply and the first node. At step 1030, the timing control circuit generates a third control signal and a fourth control signal, wherein the third control signal has a first pre-determined delay from a first edge of the first control signal, and the fourth control signal has a second pre-determined delay from a second edge of the second control signal. At step 1040, operation of a first sample-and-hold (S&H) circuit is controlled with the third control signal, wherein an input of the first S&H circuit is coupled to the first node. As step 1050, operation of a second S&H circuit is controlled with the fourth control signal, wherein an input of the second S&H circuit is coupled to a second end of a coil, wherein a first end of the coil is coupled to the first node, and the second end of the coil is coupled to the electrical ground through a capacitor.

Embodiments may achieve advantages. For example, by using sample-and-hold circuits and synchronized sampling control signals, cycle-to-cycle detection of the current envelope and voltage envelope is achieved, which allows for simple, compact circuitry for ASK demodulation and ease of integration into mobile devices. The cycle-to-cycle detection naturally provides a high-pass behavior (e.g., real-time cycle-to-cycle detection) for fast detection of changes in peak (or near peak) voltage or peak (or near peak) current. The sample-and-hold method naturally rejects the switching frequency. The output of the disclosed power transmitters (e.g., the output of the S&H circuit) may be converted into digital data by ADCs and processed by digital hardware or software to demodulate/decode the transmitted data. Various digital signal processing methods may be used to further enhance the accuracy and robustness of the demodulation.

Example embodiments of the present invention are summarized here. Other embodiments can also be understood from the entirety of the specification and the claims filed herein.

Example 1. In an embodiment, a power transmitter includes: a first switch and a second switch, wherein the first switch and the second switch are connected at a first node, wherein the second switch is configured to be coupled between a power supply and the first node, and the first switch is configured to be coupled between the first node and a reference voltage node; a coil, wherein a first end of the coil is coupled to the first node, and a second end of the coil is configured to be coupled to the reference voltage node; a timing control circuit, wherein the timing control circuit is configured to generate a first control signal coupled to a first control terminal of the first switch, and configured to generate a second control signal coupled to a second control terminal of the second switch, wherein the first control signal and the second control signal are configured to turn ON the first switch while the second switch is turned OFF, and configured to turn OFF the first switch while the second switch is turned ON, wherein the first switch and the second switch are configured to be turned ON and OFF alternately at a same switching frequency; a first sample-and-hold (S&H) circuit coupled to the first node; and a second S&H circuit coupled to the second end of the coil, wherein the timing control circuit is further configured to generate a third control signal and a fourth control signal, wherein the third control signal enables the first S&H circuit to sample at the switching frequency, and the fourth control signal enables the second S&H circuit to sample at the switching frequency.

Example 2. The power transmitter of Example 1, wherein there is a pre-determined delay between the third control signal and the fourth control signal.

Example 3. The power transmitter of Example 2, wherein the third control signal and the fourth control signal are synchronized with the first control signal and the second control signal.

Example 4. The power transmitter of Example 1, wherein the third control signal is generated at a first pre-determined delay from a first edge of the first control signal, and the fourth control signal is generated at a second pre-determined delay from a second edge of the second control signal.

Example 5. The power transmitter of Example 4, wherein the first pre-determined delay has a negative value, and the second pre-determined delay has a positive value.

Example 6. The power transmitter of Example 5, wherein the first edge is a falling edge of the first control signal or a rising edge of the first control signal.

Example 7. The power transmitter of Example 6, wherein the second edge is a rising edge of the second control signal or a falling edge of the second control signal.

Example 8. The power transmitter of Example 1, wherein the power transmitter further comprises a capacitor coupled in series with the coil, wherein a resonance frequency of the power transmitter is determined by a capacitance of the capacitor and an inductance of the coil, wherein the resonance frequency is lower than the switching frequency.

Example 9. The power transmitter of Example 1, wherein the power transmitter further comprises: a first driver circuit coupled between a first output of the timing control circuit and the first control terminal of the first switch; and a second driver circuit coupled between a second output of the timing control circuit and the second control terminal of the second switch.

Example 10. The power transmitter of Example 1, further comprising: a first filter coupled between the first node and the first S&H circuit; and a second filter coupled between the second end of the coil and the second S&H circuit.

Example 11. The power transmitter of Example 10, wherein the first filter and the second filter are low-pass filters.

Example 12. The power transmitter of Example 11, further comprising a voltage divider coupled between the second filter and the second end of the coil.

Example 13. In an embodiment, a method of operating a power transmitter includes: generating, by a timing control circuit of the power transmitter, a first control signal and a second control signal; supplying the first control signal and the second control signal to a first control terminal of a first switch and a second control terminal of a second switch, respectively, wherein the first control signal turns ON and OFF the first switch alternately at a first switching frequency, wherein the second control signal turns ON and OFF the second switch alternately at the first switching frequency, wherein the first switch and the second switch are connected at a first node, the first switch is coupled between the first node and an electrical ground, and the second switch is coupled between a power supply and the first node; generating, by the timing control circuit, a third control signal and a fourth control signal, wherein the third control signal has a first pre-determined delay from a first edge of the first control signal, and the fourth control signal has a second pre-determined delay from a second edge of the second control signal; controlling operation of a first sample-and-hold (S&H) circuit with the third control signal, wherein an input of the first S&H circuit is coupled to the first node; and controlling operation of a second S&H circuit with the fourth control signal, wherein an input of the second S&H circuit is coupled to a second end of a coil, wherein a first end of the coil is coupled to the first node, and the second end of the coil is coupled to the electrical ground through a capacitor.

Example 14. The method of Example 13, wherein the third control signal and the fourth control signal have a frequency that is equal to the first switching frequency, wherein the first pre-determined delay has a negative value, and the second pre-determined delay has a positive value.

Example 15. The method of Example 14, wherein the first edge of the first control signal is a falling edge or a rising edge.

Example 16. The method of Example 15, wherein the second edge of the second control signal is a rising edge or a falling edge.

Example 17. The method of Example 14, wherein a resonance frequency of an LC tank circuit comprising the coil and the capacitor is lower than the first switching frequency.

Example 18. In an embodiment, a power transmitter includes: a first switch coupled between a first node and a reference voltage node; a second switch configured to be coupled between a power supply and the first node; a coil and a capacitor coupled in series between the first node and the reference voltage node; a first sample-and-hold (S&H) circuit, wherein an input of the first S&H circuit is coupled to the first node; and a timing control circuit configured to generate a first control signal, a second control signal, and a third control signal, wherein the first control signal, the second control signal, and the third control signal have a same frequency, wherein the first control signal is configured to turn ON and OFF the first switch alternately, the second control signal is configured to turn ON and OFF the second switch alternately, and the third control signal determines a sampling time of the first S&H circuit, wherein the third control signal has a first pre-determined delay from a first edge of the first control signal.

Example 19. The power transmitter of Example 18, further comprising a second S&H circuit, wherein an input of the second S&H circuit is coupled to a second node between the coil and the capacitor, wherein the timing control circuit is further configured to generate a fourth control signal having the same frequency as the third control signal, wherein the fourth control signal determines a sampling time of the second S&H circuit, wherein the fourth control signal has a second pre-determined delay from a second edge of the second control signal.

Example 20. The power transmitter of Example 19, wherein the first pre-determined delay has a negative value, and the second pre-determined delay has a positive value.

Example 21. The power transmitter of Example 20, wherein each of the first edge and the second edge is a falling edge or a rising edge.

Example 22. The power transmitter of Example 20, further comprising: a first amplitude-shift keying (ASK) demodulation circuit coupled to an output of the first S&H circuit; and a second ASK demodulation circuit coupled to an output of the second S&H circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A power transmitter comprising:
   a first switch coupled between a first node and a reference voltage node;
   a second switch coupled between the first node and a power supply node;
   a coil having a first end coupled to the first node and having a second end coupled to the reference voltage node;
   a timing control circuit, wherein the timing control circuit is configured to generate a first control signal and a second control signal at a first output terminal of the timing control circuit and a second output terminal of the timing control circuit, respectively, wherein the first control signal is configured to turn the first switch ON and OFF alternately at a switching frequency, and the second control signal is configured to turn the second switch ON and OFF alternately at the switching frequency; and
   a first sample-and-hold (S&H) circuit coupled to the first node or to the second end of the coil, wherein the timing control circuit is further configured to generate a third control signal, wherein the third control signal enables the first S&H circuit to sample at the switching frequency.

2. The power transmitter of claim 1, wherein the first control signal and the second control signal are configured to turn ON the first switch while the second switch is turned OFF, and configured to turn OFF the first switch while the second switch is turned ON.

3. The power transmitter of claim 2, wherein the third control signal is synchronized with the first control signal and the second control signal.

4. The power transmitter of claim 2, further comprising a second S&H circuit, wherein the first S&H circuit is coupled to the first node, and the second S&H circuit is couple to the second end of the coil.

5. The power transmitter of claim 4, wherein the timing control circuit is further configured to generate a fourth control signal, wherein the fourth control signal enables the second S&H circuit to sample at the switching frequency.

6. The power transmitter of claim 5, wherein there is a pre-determined delay between the third control signal and the fourth control signal.

7. The power transmitter of claim 6, wherein the third control signal is generated at a first pre-determined delay from a first edge of the first control signal, and the fourth control signal is generated at a second pre-determined delay from a second edge of the second control signal.

8. The power transmitter of claim 7, wherein the first edge is a falling edge of the first control signal or a rising edge of the first control signal, wherein the second edge is a rising edge of the second control signal or a falling edge of the second control signal.

9. The power transmitter of claim 8, wherein the first pre-determined delay has a negative value, and the second pre-determined delay has a positive value.

10. The power transmitter of claim 1, wherein the first output terminal of the timing control circuit is coupled to a first control terminal of the first switch, and the second output terminal of the timing control circuit is coupled to a second control terminal of the second switch.

11. The power transmitter of claim 10, wherein the power transmitter further comprises:
    a first driver circuit coupled between the first output terminal of the timing control circuit and the first control terminal of the first switch; and a second driver circuit coupled between the second output terminal of the timing control circuit and the second control terminal of the second switch.

12. The power transmitter of claim 1, wherein the power transmitter further comprises a capacitor coupled between the second end of the coil and the reference voltage node, wherein a resonance frequency of the power transmitter is determined by a capacitance of the capacitor and an inductance of the coil, wherein the resonance frequency is lower than the switching frequency.

13. A power transmitter comprising:
a first switch coupled between a first node and a reference voltage node;
a second switch configured to be coupled between a power supply and the first node;
a coil and a capacitor coupled in series between the first node and the reference voltage node;
a first sample-and-hold (S&H) circuit, wherein an input of the first S&H circuit is coupled to a second node between the coil and the capacitor; and
a timing control circuit configured to generate a first control signal, a second control signal, and a third control signal, wherein the first control signal, the second control signal, and the third control signal have a same frequency, wherein the first control signal is configured to turn the first switch ON and OFF alternately, the second control signal is configured to turn the second switch ON and OFF alternately, and the third control signal determines a sampling time of the first S&H circuit, wherein the third control signal has a first pre-determined delay from a first edge of the second control signal.

14. The power transmitter of claim 13, wherein the first edge is a falling edge or a rising edge.

15. The power transmitter of claim 13, wherein the first pre-determined delay has a positive value.

16. The power transmitter of claim 13, further comprising a second S&H circuit, wherein an input of the second S&H circuit is coupled to the first node, wherein the timing control circuit is further configured to generate a fourth control signal having the same frequency as the third control signal, wherein the fourth control signal determines a sampling time of the second S&H circuit, wherein the fourth control signal has a second pre-determined delay from a second edge of the first control signal.

17. The power transmitter of claim 16, wherein the second edge is a falling edge or a rising edge.

18. The power transmitter of claim 17, wherein the second pre-determined delay has a negative value.

19. A method of operating a power transmitter, the method comprising:
generating, by a timing control circuit of the power transmitter, a first control signal and a second control signal;
supplying the first control signal and the second control signal to a first control terminal of a first switch and a second control terminal of a second switch, respectively, wherein the first control signal turns ON and OFF the first switch alternately at a first switching frequency, wherein the second control signal turns ON and OFF the second switch alternately at the first switching frequency, wherein the first switch and the second switch are connected at a first node, the first switch is coupled between the first node and an electrical ground, and the second switch is coupled between a power supply and the first node;
generating, by the timing control circuit, a third control signal, wherein a frequency of the third control signal is a same as the first switching frequency; and
controlling operation of a first sample-and-hold (S&H) circuit with the third control signal, wherein an input of the first S&H circuit is coupled to the first node or to a first end of a coil, wherein the first end of the coil is coupled to the electrical ground through a capacitor, and a second end of the coil is coupled to the first node.

20. The method of claim 19, further comprising:
generating, by the timing control circuit, a fourth control signal, wherein a frequency of the fourth control signal is a same as the first switching frequency; and
controlling operation of a second S&H circuit with the fourth control signal, wherein the input of the first S&H circuit is coupled to the first node, and an input of the second S&H circuit is coupled to the first end of the coil.

21. The method of claim 20, wherein the third control signal has a first pre-determined delay from a first edge of the first control signal, wherein the fourth control signal has a second pre-determined delay from a second edge of the second control signal.

22. The method of claim 21, wherein the first pre-determined delay has a negative value, and the second pre-determined delay has a positive value.

23. The method of claim 22, wherein the first edge of the first control signal is a falling edge or a rising edge, wherein the second edge of the second control signal is a rising edge or a falling edge.

* * * * *